Patented Mar. 18, 1952

2,589,305

UNITED STATES PATENT OFFICE 2,589,305

DEHYDRATION OF STEROID SIDE-CHAIN SECONDARY ALCOHOLS

George B. Spero, Robert H. Levin, and Frederick W. Heyl, Kalamazoo, Mich., assignors to The Upjohn Company, Kalamazoo, Mich., a corporation of Michigan No Drawing. Application December 4, 1948, Serial No. 63,615

9 Claims. (Cl. 260—397.5)

This invention relates to the dehydration of secondary cyclopentanopolyhydrophenanthrene alcohols wherein one secondary hydroxyl group is in a side-chain attached to carbon atom 17 of the steroid nucleus, which are represented by the general structural formula:

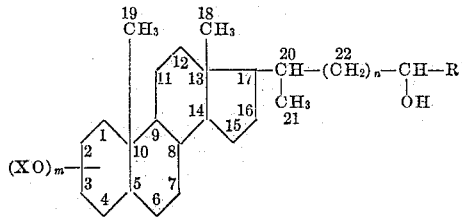

in which R is an alkyl, aralkyl, aryl, or alkoxyaryl radical, X is a hydrogen or an alkyl radical, and $n$ and $m$ are 0, 1, or 2, and to certain products obtainable thereby. The steroid nucleus may be saturated or unsaturated at various positions therein, and the —OX radicals in the steroid nucleus may also be substituted in any position in any of the various rings. While this invention is described with particular reference to those compounds wherein the aryl group (R) is phenyl and p-methoxyphenyl, it is to be understood that alpha-naphthyl, beta-naphthyl, methoxynaphthyl and other radicals are likewise within the scope of this invention. Practical considerations limit the aryl group to those whose halogen substitution derivatives react in a satisfactory manner with magnesium to form an arylmagnesium halide (Grignard) compound.

The products of this invention are useful intermediates in the preparation of steroids having a carbonyl group in a side-chain attached to the carbon atom in the 20 position.

The dehydration of steroid tertiary alcohols wherein the tertiary alcohol group is in the side chain is known to take place readily. However, the conditions under which this dehydration is known to take place are not effective for the dehydration of steroid side-chain secondary alcohols. Furthermore, many of the common reagents used for the dehydration of secondary alcohols that do not have a cyclopentanopolyhydrophenanthrene nucleus are inoperative when used as dehydrating agents with the secondary alcohols of this invention. For example, phosphorus oxychloride, concentrated sulfuric acid, activated alumina and para-toluenesulfonic acid are ineffective while thionyl chloride in pyridine (Darzen's method) causes replacement of the side-chain hydroxyl by chlorine but does not effect dehydration.

It is an object of this invention to provide a method for the dehydration of steroid side-chain secondary alcohols. It is a further object of this invention to provide a method for the dehydration of steroid side-chain secondary alcohols containing a single aryl, alkyl, aralkyl or alkoxyaryl radical attached to the carbon atom carrying the hydroxyl group. It is an additional object of this invention to provide a method of dehydrating steroid side-chain secondary alcohols which also have one or more secondary hydroxyl groups in the cyclopentanopolyhydrophenanthrene nucleus without effecting dehydration of the nuclear hydroxyl groups. Another object of this invention is to provide compounds which are useful intermediates in the synthesis of 17-keto steroids. It is also an additional object of this invention to provide a method for the preparation of new and novel compounds which are useful in the synthesis of pregnenolone and progesterone. Other objects and advantages of this invention, some of which are referred to hereinafter, will be obvious to those skilled in the art to which the invention pertains.

It has now been found that the objects of this invention may be obtained by the use as a dehydrating agent of a member of the group consisting of (1) p-toluenesulfonic acid, in the presence of phenol and (2) anhydrous oxalic acid at elevated temperatures. It was unexpected that the dehydration of the side-chain secondary hydroxyl group could be effected without simultaneous dehydration of nuclear hydroxyl groups.

The preparation of certain of the steroid alcohols which may be dehydrated by the method of this invention have been described in the copending application of Robert H. Levin, A. Vern McIntosh, Jr., and Albert P. Centolella, Serial 40,166, filed July 22, 1948, and also in J. Am. Chem. Soc. 70, 2958 (1948) and J. Am. Chem. Soc. 69, 1957 (1947). Certain of the products resulting from the use of the method of this invention have been described and claimed in the copending applications of Frederick W. Heyl and Albert P. Centolella, Serial No. 63,617, now Patent No. 2,576,937, and A. Vern McIntosh, Jr., Robert H. Levin, and George B. Spero, Serial No. 63,616, now Patent No. 2,575,351, both of which were filed concurrently herewith.

According to the method of this invention, a steroid side-chain secondary alcohol, dissolved in an inert solvent, which may be an aromatic hydrocarbon, an aromatic ether, or a mixture of both, is heated under reflux with a mixture of p-toluenesulfonic acid and phenol, or with anhydrous oxalic acid. Among the hydrocarbon solvents suitable for use in the method of this invention are toluene, xylene, p-cymene, diphenyl, diphenyl ether, anisole, phenetole, mixtures thereof, and other similar hydrocarbons and ethers. It is preferred that the hydrocarbon, ether, or mixtures thereof boil between 110 and 300 degrees centigrade in order that sufficient heat may be applied to the reaction mixture to cause dehydration. The higher ranges of temperatures are preferred in conjunction with anhydrous oxalic acid while the lower ranges are preferred with the mixture of phenol and p-toluenesulfonic acid.

After completion of the dehydration reaction, the inert reaction solvent is removed, preferably by steam distillation or distillation under reduced pressure. The residual solid side-chain unsaturated steroid is then collected and purified, for example, by crystallization or by chromatography using alumina and a benzene-methanol mixture as the developing solution, or a combination of both procedures. The ultraviolet absorption spectra of certain of the products of this reaction show a principal peak at about 252 millimu, which is in agreement with known compounds where the side-chain double bond is conjugated with an aryl group. If dehydration had occurred in the steroid nucleus the absorption spectra would not show this peak.

The following examples are given by way of illustration but are not to be considered as limiting:

EXAMPLE 1.—3(BETA)-HYDROXY-22-PHENYL-BISNOR-5,20:22-CHOLADIENE

One gram of 3(beta), 22-dihydroxy-22-phenyl-bisnor-5-cholene, which is also known as 22-phenyl- 22 -hydroxy - bisnor- 5 -cholenol [F. W. Heyl, A. P. Centolella, and M. E. Herr, J. Am. Chem. Soc. 69, 1960 (1947)], 4.0 grams of anhydrous oxalic acid and 40 milliliters of a mixture of diphenyl and diphenyl oxide (Dowtherm A) were mixed and heated under reflux for ninety minutes. The mixture was cooled, diluted with 100 milliliters of ether and washed with water. The ethereal solution was steam-distilled to remove the diphenyl and diphenyl ether. The aqueous residue on cooling was extracted with ether. The ether solution was dried, and ether removed and the residue crystallized from isopropyl ether. There was thus obtained 0.21 gram of 3(beta)-hydroxy - 22 - phenyl-bisnor-5,20:22-choladiene melting at 180–188 degrees centigrade. After recrystallization from acetone the product melted at 184–187 degrees centigrade.

When the 3(beta)-hydroxy-22-phenyl-bisnor-5,20:22-choladiene melting at 184–187 degrees centigrade was shaken at room temperature with methanolic potassium hydroxide a diastereoisomer is obtained melting at 149.5–151.5 degrees centigrade. Chromatography over aluminum oxide also converted the high melting isomer into the low melting form.

EXAMPLE 2.—3-HYDROXY-22-ALPHA-NAPHTHYL-BISNOR-5,20:22-CHOLADIENE

When dehydrated in a manner similar to that described in Example 1, 3,22-dihydroxy-22-alpha-naphthyl - bisnor-5-cholene yields 3-hydroxy-22-alpha-naphthyl-bisnor-5,20:22-choladiene.

Preparation 1.—3-acetoxy - 22 - phenyl-bisnor-5,20:22-choladiene

A solution of 0.31 gram of 3-hydroxy-22-phenyl - bisnor- 5,20:22 -choladiene (melting at 149.5–151.5 degrees centigrade) in a mixture of five milliliters of pyridine and five milliliters of acetic anhydride was heated on a steam bath to about 90 degrees centigrade for one and one-half hours. Upon cooling, the solution was poured into ice water and the resulting solid precipitate separated and washed with water. The solid was crystallized from methanol, yielding 0.2 gram of 3-acetoxy-22-phenyl - bisnor-5,20:22-choladiene melting at 150–156 degrees centigrade. Further crystallizations from methanol gave a product melting at 158.5–160.5 degrees centigrade. Its percentage analysis was as follows:

Calculated for $C_{30}H_{40}O_2$: C, 83.28  H, 9.32  $CH_3CO$, 9.95
Found:           82.94     9.18              10.28

In a like manner, using propionic anhydride instead of acetic anhydride, 3-propionoxy-22-phenyl-bisnor-5,20:22-choladiene is obtained.

In a like manner, using butyric anhydride instead of acetic anhydride, 3-butyroxy-22-phenyl-bisnor-5,20:22-choladiene is obtained.

EXAMPLE 3.—3-METHOXY-22-PHENYL-BISNOR-5,20:22-CHOLADIENE

A solution of 0.5 gram of 3-methoxy-22-phenyl-22-hydroxy - bisnor -5- cholene, 0.02 gram of phenol and 0.05 gram of p-toluenesulfonic acid monohydrate dissolved in 200 milliliters of toluene was heated under reflux using a water trap for eighteen hours. After cooling, the solution was washed until neutral with five percent sodium hydroxide solution and water, the toluene then being removed under reduced pressure. The crystalline residue was dissolved in fifty milliliters of benzene and the benzene solution passed over a column of 15 grams of activated alumina (Fisher adsorption). The product which was adsorbed on the alumina was eluted by passing through the column successive 40 milliliter portions of anhydrous benzene. The first four portions of the eluate were combined and on removal of the solvent gave 370 milligrams of crystalline 3-methoxy-22-phenyl - bisnor-5,20:22-choladiene which melted at 166–169 degrees centigrade after crystallization from a mixture of methanol and chloroform.

Preparation 2.—24 - phenyl -(delta-5) - cholene-3,24-diols

To a Grignard solution prepared from 0.6 gram of magnesium and 5.5 grams of bromobenzene in 250 milliliters of anhydrous ether, was added over a period of one hour 2.0 grams of 3(beta)-acetoxy-(delta-5)-cholene-24-al [A. Vern McIntosh, Jr., Elizabeth M. Meinzer, and Robert H. Levin, J. Am. Chem. Soc. 70, 2956 (1948)] dissolved in 75 milliliters of benzene. The reaction mixture was heated under reflux during the mixing of the reagents and for one hour thereafter. The mixture was then cooled and 3N hydrochloric acid added to decompose the resulting Grignard complex. An insoluble precipitate of the stereoisomeric 24-phenyl -(delta-5)- cholene-3(beta), 24 diols was obtained. This precipitate, upon crystallization from benzene, gave an isomer (A) melting at 214–217 degrees centigrade; $[\alpha]_D^{25}$—7.0 degrees.

The ether-benzene phase mother liquors from the above were separated and steam-distilled. The resulting water-insoluble, nonvolatile residue, which melted at 186–190 degrees centigrade, upon crystallization from benzene, gave an isomer (B) melting at 184–186 degrees centigrade; $[\alpha]_D^{25}$—38.2 degrees.

*Preparation 3.—3-hydroxy-24-keto-p-anisyl-(delta-5)-cholene*

To a Grignard solution prepared from 2.4 grams of magnesium, 13 milliliters of p-bromoanisole, and fifty milliliters of anhydrous ether, cooled in an ice bath, there was added 9.17 grams of anhydrous cadmium chloride. The mixture was heated under reflux for one hour and then cooled to zero degrees centigrade. A solution of 8.0 grams of 3(beta) - formyloxy - (delta-5) - cholenic acid chloride [Willard M. Hoehn and Robert Bruce Moffett, J. Am. Chem. Soc. 67, 740 (1945)] in fifty milliliters of benzene was added over a period of twenty minutes. The reaction mixture was heated under reflux for one hour, cooled, and poured into a mixture of ice and hydrochloric acid. The ether-benzene layer was separated, washed with dilute sodium hydroxide solution and water, dried, and evaporated to dryness. The resulting residue was saponified by refluxing for one hour with 100 milliliters of five percent methanolic potassium hydroxide solution. After saponification, the solution was diluted with water and extracted with ether. The ether was washed, dried, and evaporated to dryness. The resulting residue, consisting essentially of 3(beta)-hydroxy-24-keto-24-p-anisyl-(delta-5)-cholene, was crystallized from acetone; melting point 154–157 degrees centigrade; oxime, melting point 177–179 degrees centigrade.

*Preparation 4.—24-p-anisyl-(delta-5)-cholene-3,24-diols*

To a solution of 2.45 grams of lithium alumium hydride in 200 milliliters of anhydrous ether, a solution of 4.35 grams of 3(beta)-hydroxy-24-keto-24-p-anisyl-(delta-5)-cholene (Preparation 3) in 1300 milliliters of anhydrous ether was added over a period of twenty minutes. The reaction mixture was maintained under an atmosphere of nitrogen and was agitated during the addition; thereafter the mixture was allowed to stand at room temperature for forty minutes while maintained in the asmosphere of nitrogen. Excess lithium aluminum hydride was slowly decomposed by addition of water and 200 milliliters of iced five percent hydrochloric acid was added. Some of the product precipitated at this point and was filtered from solution. The aqueous phase was then extracted with chloroform and ether and the chloroform fractions were washed with water, combined, dried and concentrated. On cooling, a mixture of isomers of 24-p-anisyl-(delta-5)-cholene-3(beta), 24 diols crystallized. The yield was 3.1 grams; melting point 160–185 degrees centigrade.

EXAMPLE 4.—3(BETA)-HYDROXY-24-PHENYL-5,23-CHOLADIENE

A mixture of eight grams of the two epimers of 24 - phenyl-5-cholene-3(beta),24-diols (Preparation 2), 16 grams of anhydrous oxalic acid and 160 milliliters of a mixture of diphenyl oxide and diphenyl (Dowtherm A) were heated under reflux for ninety minutes. The bulk of the solvent was removed under reduced pressure. During the removal of the solvent the excess oxalic acid sublimed from the reaction mixture. The residue was cooled and dissolved in 200 milliliters of ether. The ether solution was washed successively with two percent sodium bicarbonate solution and water, dried, and the ether removed. The residue was dissolved in 200 milliliters of purified commercial hexane and passed over 230 grams of alumina (Fisher adsorption alumina) in a column five centimeters in diameter. Elution of the column with 700 milliliters of a mixture of equal parts of hexane and benzene removed the remainder of the Dowtherm A. Elution of the column with 800 milliliters of a mixture of benzene (92 parts) and methanol (8 parts), evaporation of the solvent and crystallization from ether, yielded 5.28 grams of 3(beta)-hydroxy-24-phenyl-5,23-choladiene melting at 108–118 degrees centigrade. The product could not be crystallized to a narrower range because of its tendency to solvate.

*Preparation 5.—3-acetoxy-24-phenyl-5,23-choladiene*

The 3(beta) - hydroxy-24-phenyl-5,23-choladiene (Example 4) was mixed with acetic anhydride and pyridine and heated at 90–100 degrees centigrade for three hours. The reaction mixture was poured into water, the aqueous mixture extracted with ether, dried and the ether removed. The resulting 3-acetoxy-24-phenyl-5,23-choladiene after crystallization from methanol melted at 176.5–177.5 degrees centigrade and showed a levo rotation of $[\alpha]_D^{25}$—31.4 degrees. Its percentage analysis was as follows:

Calculated for $C_{32}H_{44}O_2$: C, 83.43  H, 9.63  Acetyl, 9.3
Found: 83.10  9.60  10.2

The tetrabromide formed by the addition of bromine to the acetate in chloroform, after crystallization from a mixture of methanol and ether, melted at 176–179 degrees centigrade.

*Preparation 6.—3,12,23-trihydroxy-23-phenyl-nor-cholane*

A solution of 1.15 grams of 3(alpha), 12(alpha)-diacetoxy-23-keto-23-phenyl-nor-cholane [William M. Hoehn and Robert Bruce Moffett, J. Am. Chem. Soc. 67, 740 (1945)] in 75 milliliters of anhydrous ether was added dropwise to a solution of 1.3 grams of lithium aluminum hydride in 100 milliliters of anhydrous ether. The mixture was allowed to stand under room conditions for an additional thirty minutes and thereafter the unreacted lithium aluminum hydride was decomposed by the careful addition of water. Iced ten percent hydrochloric acid was then added, the resulting two layers separated and the water layer extracted with chloroform. The combined ether and chloroform extracts were washed with water, dried and the solvents removed. The residue, after crystallization from benzene, yielded 0.6 gram of 3(alpha), 12(alpha), 23-trihydroxy-23-phenyl-nor-cholane melting at 206–240 degrees centigrade. After several additional crystallizations from benzene the product melted at 246–248 degrees centigrade. Its percentage analysis was as follows:

Calculated for $C_{29}H_{44}O_3$: C, 79.04  H, 10.06
Found: 78.78  9.50

EXAMPLE 5.—3,12-DIHYDROXY-23-PHENYL-NOR-22-CHOLENE

A mixture of 600 milligrams of 3(alpha), 12(alpha),23-trihydroxy-23-phenyl-nor-cholane (Preparation 6), 2.4 grams of anhydrous oxalic acid and 24 milliliters of a mixture of diphenyl and diphenyl ether (Dowtherm A) was heated under reflux for two hours. The mixture was cooled, diluted with 100 milliliters of ether and washed with five percent sodium carbonate solution and with water. The ethereal solution was steam-distilled until the Dowtherm A was removed and the residual solid extracted with benzene. The benzene solution was poured over a column of alumina and the adsorbed product eluted with a mixture of benzene (ninety-six parts) and methonal (four parts). The solvent was removed, whereupon solid 3(alpha), 12-(alpha)-dihydroxy-23-phenyl-nor-cholene having an ultraviolet absorption peak at 251 millimu, $E_{mol}=8000$, was obtained.

*Preparation 7.—3(alpha), 12(alpha)-diacetoxy-23-phenyl-nor-22-cholene*

The 3(alpha), 12(alpha)-dihydroxy-23-phenyl-nor-cholene (Example 5) was heated under reflux with acetic anhydride and pyridine for one hour. Upon cooling, the reaction mixture was poured into water and the aqueous solution extracted with benzene. The benzene solution was washed successively with five percent sodium carbonate solution and water, and the benzene solution dried and poured over a column of alumina as in Example 3. The column was eluted with portions of benzene containing from 0.5 to 4.0 percent methanol. The eluates were evaporated to dryness whereupon 208 milligrams of 3(alpha), 12(alpha)-diacetoxy-22-phenyl - nor-22-cholene was obtained, which, after crystallization from methanol, melted at 71–75 degrees centigrade and showed on ultraviolet absorption spectra peak at 250 millimu, $E=14,500$. Its percentage analysis was as follows:

Calculated for $C_{33}H_{46}O_4$: Acetyl, 16.99
Found: 17.05

EXAMPLE 6.—3-HYDROXY-24-P-ANISYL-5,23-CHOLADIENE

A mixture of one gram of the pimers of 3-(beta),24-dihydroxy-24-p-anisyl-(delta-5)-cholene (Preparation 4), 40 milliliters of a mixture of diphenyl and diphenyl oxide (Dowtherm A) and 4.0 grams of anhydrous oxalic acid was heated under reflux for two hours. The reaction mixture was cooled, diluted with 60 milliliters of benzene, washed with water and dried. The solution was passed through a column of chromatographic grade alumina. The column was eluted first with 100 milliliters of benzene and then with 100 milliliters of a mixture of benzene (92 parts) and methanol (8 parts). The benzene eluate containing the Dowtherm A was discarded. The second eluate was evaporated to dryness, and the solid residue, after several crystallizations from methanol, gave 0.6 gram of 3-hydroxy-24-p-anisyl-5,23-choladiene melting at 158–161 degrees centigrade. The ultraviolet absorption spectra showed a peak at 262 millimu, $E=28,300$.

Inasmuch as the foregoing description comprises preferred embodiments of the invention it is to be understood that variations and modifications may be made therein and that the invention is to be limited in scope solely by the appended claims.

We claim:
1. A process for the production of a steroid compound having an unsaturated side-chain attached to the carbon atom in the 17 position, which comprises the selective dehydration of a 17-side-chain secondary alcohol having the general skeletal steroid structure represented by the formula:

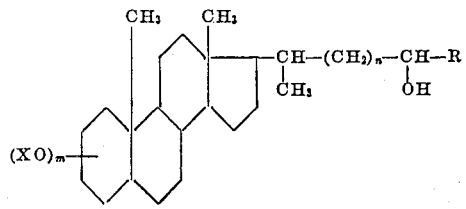

in which R is a member of the group consisting of aryl, and alkoxyaryl radicals and X is a member of the group consisting of hydrogen and alkyl radicals, and n and m are integers of the group consisting of 0, 1, and 2, which comprises heating a solution of the said secondary alcohol in an inert solvent in the presence of a dehydrating agent of the group consisting of (1) oxalic acid and (2) a mixture of para-toluenesulfonic acid and phenol, and recovering the resulting unsaturated steroid compound.

2. A process as defined in claim 1 in which the inert solvent is a member of the group consisting of aromatic hydrocarbons and aromatic ethers having a boiling point between 110 and 300 degrees centigrade and mixtures thereof.

3. A process as defined in claim 1 in which the heating is carried out at the boiling point of the inert solvent.

4. A process as defined in claim 1 in which the secondary alcohol is 3(beta),22-dihydroxy-22-phenyl-bisnor-5-cholene.

5. A process as defined in claim 1 in which the secondary alcohol is 3-methoxy-22-phenyl-22-hydroxy-bisnor-5-cholene.

6. A process as defined in claim 1 in which the secondary alcohol is 24-phenyl-5-cholene-3(beta),24-diol.

7. A process for the production of 3(beta)-hydroxy - 22 - phenyl - bisnor - 5,20:22 - choladiene which comprises the selective dehydration by heating 3(beta),22-dihydroxy-22-phenyl-bisnor-5-cholene in the presence of oxalic acid in a high-boiling inert solvent, and recovering the resulting unsaturated compound therefrom.

8. A 23-mono-phenyl-nor-22-cholene.

9. 3,12 - dihydroxy - 23 - mono-phenyl-nor-22-cholene.

GEORGE B. SPERO.
ROBERT H. LEVIN.
FREDERICK W. HEYL.

REFERENCES CITED

The following references are of record in the file of this patent:

UNITED STATES PATENTS

| Number | Name | Date |
|---|---|---|
| 2,461,910 | Miescher | Feb. 15, 1949 |

OTHER REFERENCES

Kuzamo: Chemical Abstracts 34, col. 5851 (1940).